June 16, 1925.

L. W. ANTHONY

TRACTION WHEEL

Filed Sept. 22, 1922

L. W. Anthony INVENTOR

BY Victor J. Evans

ATTORNEY

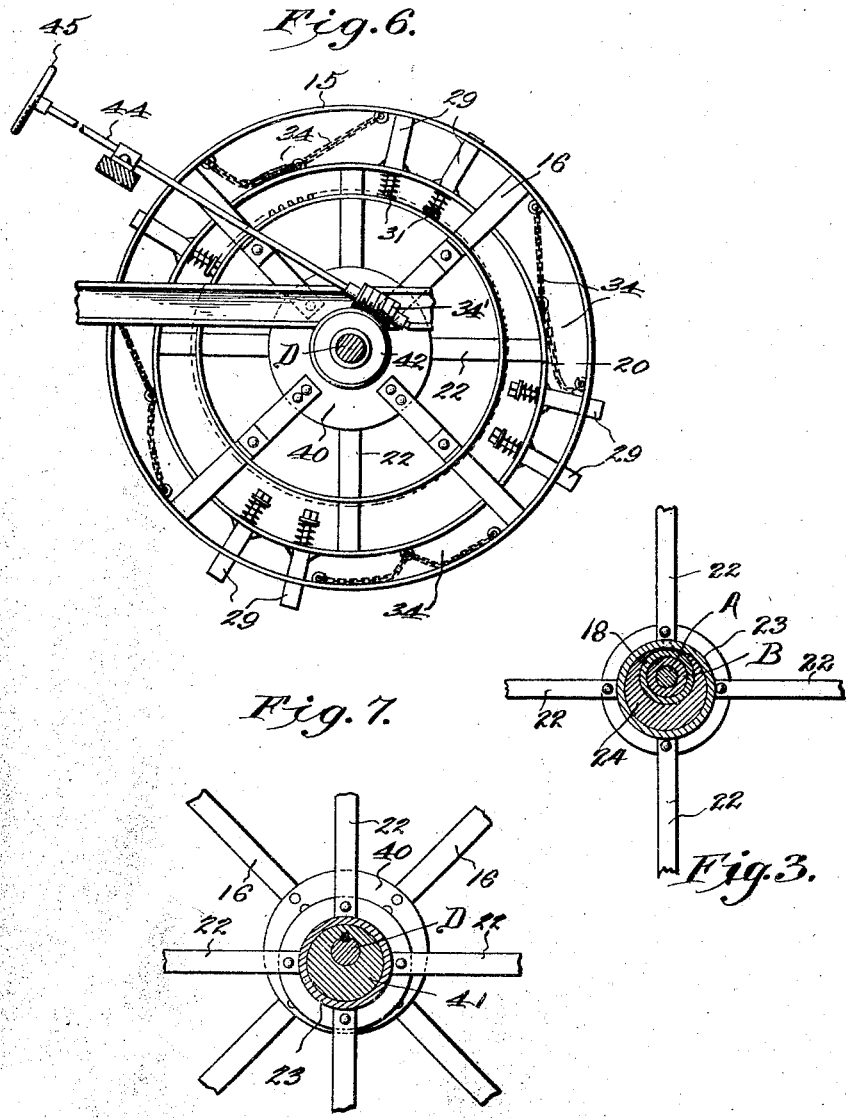

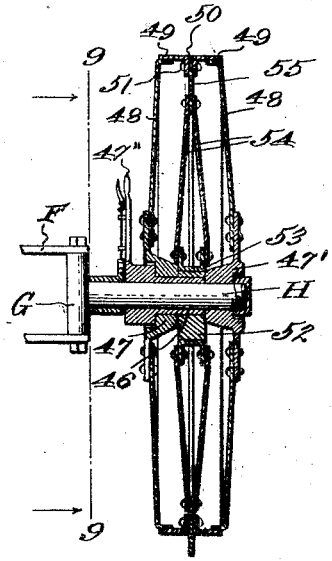
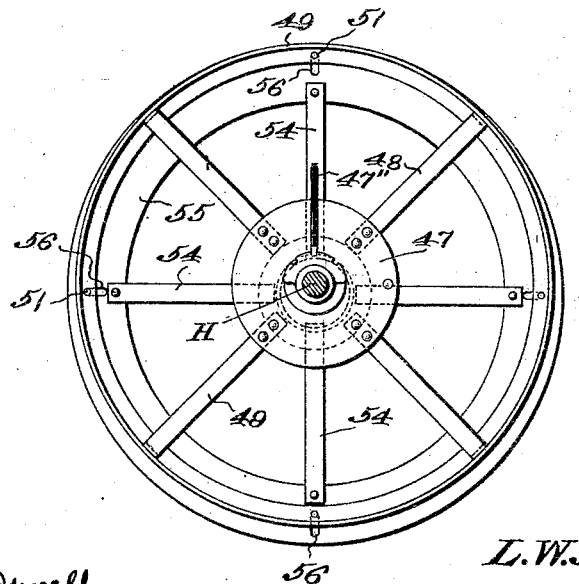

Patented June 16, 1925.

1,542,206

UNITED STATES PATENT OFFICE.

LOUIS W. ANTHONY, OF ALBANY, OREGON.

TRACTION WHEEL.

Application filed September 22, 1922. Serial No. 589,827.

*To all whom it may concern:*

Be it known that I, LOUIS W. ANTHONY, a citizen of the United States, residing at Albany, in the county of Linn and State of Oregon, have invented new and useful Improvements in Traction Wheels, of which the following is a specification.

This invention relates to wheels, particularly those of that type designed for use upon tractors and has for its object the provision of a wheel of novel construction provided with traction insuring lugs which may be caused to project automatically at every revolution of the wheel so as to bite into the ground and insure a positive drive.

An important object is the provision of a wheel of this character which is provided with means whereby the lugs may be caused to project beyond the periphery of the wheel at different points so that the lugs may be prevented from being projected at a time which would cause them to dig into and deface macadamized or other good roads while the tractor is traveling from place to place.

Another object is the provision of hand lever operated means for effecting adjustment of the point at which the lugs will be projected.

A further object is the provision of a wheel of this character which possess the advantage that the lugs are self-cleaning as they are projected and retracted by the special means provided for the purpose.

An additional object is the provision of a wheel of this character which will be simple and inexpensive in manufacture, easy to install and control, positive in action, efficient and durable in service and a general improvement in the art.

With the above and other objects and advantages in view the invention consists in the details of construction to be hereinafter more fully described and claimed and illustrated in the accompanying drawings in which:

Figure 1 is a sectional view taken longitudinally of the back axle of a tractor showing one of my wheels mounted thereon, Figure 2 is an inside elevation of a wheel with parts on the line 2—2 of Figure 1 in section, Figure 3 is a sectional view on the line 3—3 of Figure 1, Figure 4 is an elevation of the outer side of the wheel somewhat modified, Figure 5 is a longitudinal section taken through the axle of an implement carrying a bull wheel constructed in accordance with a modified form of my invention, Figure 6 is an elevation of the inner side of the wheel in a modified form, with the parts on the line 6—6 of Figure 5 shown in sections.

Figure 7 is a view on the line 7—7 of Figure 5,

Figure 8 is a section taken along the front axle of a tractor and showing a front wheel thereon constructed in accordance with a modified form of my invention.

Figure 9 is a view on the line 9—9 of Figure 8.

Figure 2:
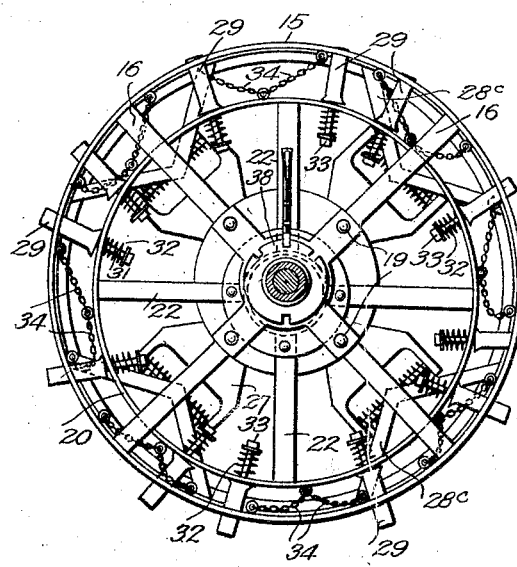
Figure 1:
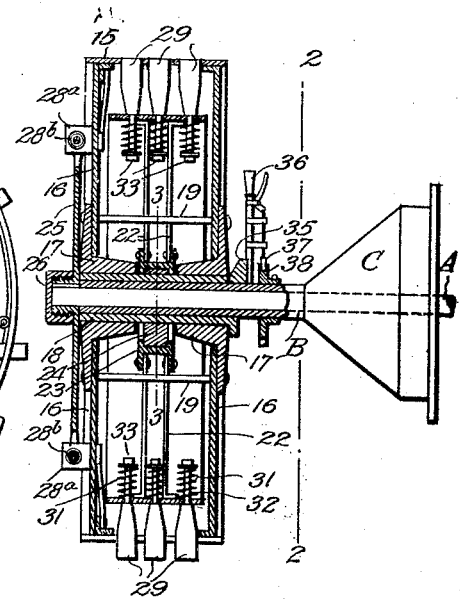
Figure 4:
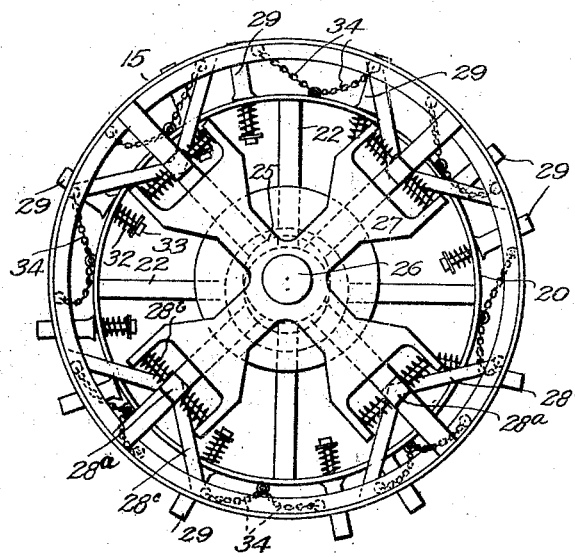

Referring more particularly to the drawings and especially Figures 1 to 4, the letter A designates one of the drive spindles of a tractor transmission, B designates the axle housing and C represents differential housing. The gearing within the differential housing is not illustrated as it forms no part of the present invention.

In carrying out my invention I provide a wheel which comprises an outer rim 15 carried by a plurality of spokes 16 which radiate from a hub 17 rotatably secured upon a sleeve 18 which is rotatable on the housing B. The hub 17 is formed in two sections bolted together by stay bolts 19 as illustrated.

The wheel further includes an inner rim 20 located between the sets of spokes 16. This inner rim is carried by spokes 22 which radiate from a collar 23 which is located between the sections of the hub 17. Rigidly secured upon the sleeve 18 is an eccentric 24 which fits within a circular opening in the center of the collar 23.

At the outer side of the wheel is a spider structure 25 keyed on the end of the axle and having a threaded extension on which is screwed a hub cap 26. This spider structure includes a plurality of arms 27 which have their outer ends forked and carrying rods 28 which extend across the forks and through lugs 28ᵃ on the spokes 16, the rods being encircled by springs 28ᵇ which abut against the arms of the forks and against opposite sides of the respective lugs 28ᵃ. The numeral 28ᶜ represents diagonal braces. The purpose of the spider and the spring rod device carried thereby is to provide a driving connection between the axle and the spokes 16.

The numeral 29 designates a series of traction lugs which are slidable through openings in the outer rim 15 and which are formed with reduced extensions 31 loosely mounted in holes in the inner rim 20. These extensions are encircled by coil springs 32 which abut against the inner periphery of the inner rim and against castellated nuts 33 screwed and cottered on to the extensions. The purpose of this particular mounting of the traction lugs on the inner rim is to provide a certain degree of play which will insure proper action and prevent binding. The inner and outer rim members are connected at intervals by chains 34 which are for the purpose of maintaining a driving connection between the inner and outer rim members.

The sleeve 18 is provided at the inside of the wheel with an extension 35 upon which is mounted a hand lever 36 provided with a grip releasing locking pawl 37 co-operating with a notched disk 38 rigidly secured upon the axle housing B.

In the operation of this form it will be seen that when the tractor or other device equipped with my wheel is driven, at every rotation of the wheel the eccentric 24 will operate to make one half of the inner rim continually approach the outer rim and another half continually recedes from it. The two dividing points between these halves are at the maximum and minimum points of separation of the two rims. When the inner rim is moved toward the outer rim the lugs 29 carried by the inner rim will be projected through the openings 30 so as to dig into the ground traveled over and insure traction. When the tractor is driven in a field or other place of like character the lever 36 is adjusted to move the sleeve 18 and consequently the eccentric 24 into such position that the inner rim will be moved toward the outer rim at the continually changing point where the outer rim engages the ground. As the wheel turns, the lugs previously projected will be subsequently retracted which will operate to clean them as they are pulled inwardly through the openings 30 in the outer rim. The cleaning action is thus entirely automatic so that the lugs will always be kept free from any accumulation of caked mud or dirt.

When traveling over pavements, macadamized roads and the like, the lever 36 is moved to a different position so that the eccentric 24 will be differently arranged and will occupy such a relative position that the inner rim will be so moved that the lugs will be in retracted position as they approach the bottom of the wheel—In order to provide the smooth ground engaging surface specified, the minimum distance between the rims or tires must be above the axis and in the vertical plane thereof. When this is done it is apparent that the lugs will not dig into the road way, the device thus complying with regulations existing in many localities requiring the removal of ribs which are so often provided upon tractor wheels.

Figure 5:
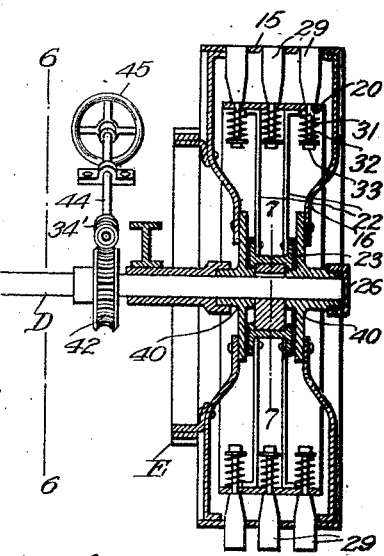

In Figures 5, 6 and 7 the axle D is shown as being of the dead type as for instance the axle on a machine having a bull gear drive. In this form the hub sections 40 of the outer wheel structure rotate directly upon the axle D while the eccentric 41 corresponding to the previously described eccentric 24 is keyed directly on to the axle.

The operation of this form is the same as that of the previously described form except that the axle is relatively stationary, the drive from the bull wheel being effected by the usual bull gear E which is secured upon one side of the spokes of the outer wheel structure.

In this form of the device the means for advancing or retarding the point at which the traction lugs will be projected consists of a worm wheel 42 secured upon the axle D and engaged by a worm 34′ secured on a control rod 44 which carries a hand wheel 45. The axle D must of course be so mounted as to have a certain degree of movement in its supports so that when the hand wheel 45 is turned and the worm wheel 42 rotated the axle D will be turned slightly to shift the position of the cam or eccentric 41 so as to control the time at which the inner member approaches and recedes from the outer member.

In Figures 8 and 9 I have shown the wheel as of a modified construction for use on the front axle of a tractor. In this form the front axle is represented by the reference character F and carries the usual spindle body G from which projects the spindle H upon which the wheel is ordinarily rotatable. In adapting my wheel for use in this location, I provide a sleeve 46 corresponding to the sleeve 18 first described and provided with an adjusting lever mechanism exactly the same as that first described. The hub sections 47 and 47′ which carry the spokes 48 secured to the outer rim 49 rotate with respect to the spindle H, one section rotating on the sleeve 46 and the other on the spindle directly. The outer rim member 49 is formed on two sections of angle bar formation spaced apart as shown at 50 and held in such spaced relation by bolts 51. Secured on the sleeve 46 is the eccentric 52 which corresponds to the eccentrics 24 and 41 and which operates within the collar 53 of the inner wheel structure. In this instance the inner wheel structure includes spokes 54 which carry a rim 55 which is of ring like formation and which is adapted to be projected through the space 50. This ring member 55 is of course formed with openings 56 for the passage of the bolts 51 so as not to interfere with the action.

In the operation of the last mentioned form it is apparent that the inner ring member 55 will slide in and out as the front wheel rotates and will effectually operate to prevent slipping of the tractor when operating upon a hill side or on a treacherous or slippery surface.

When traveling over pavements, the lever mechanism is adjusted so that the inner rim or ring member 55 will be constantly receded with respect to the successive points of engagement of the outer rim with the surface traveled over.

From the foregoing description and a study of the drawings it will be apparent that I have thus provided a simply constructed and consequently inexpensive traction wheel which will operate most efficiently for insuring traction and preventing slipping or sliding even on the most treacherous surface, ample means being provided for preventing scarring or otherwise injuring pavements and the like traveled over so as to comply with regulations on this subject. It is to be noted that in every instance the wheel is self-cleaning and will therefore not cake up and necessitate knocking hunks of mud and clay off any portion of the wheel. As the construction is so simple and the parts so few it is obvious that the device should have a long life and satisfactorily perform all of its functions.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A traction wheel comprising a sectional hub supported upon an axle, a sleeve rotatable upon the axle within the hub, means for advancing and retarding the position of the sleeve, an eccentric carried by the sleeve, a collar rotatably mounted upon the eccentric, an outer rim supported by the spokes radiating from the hub, an inner rim spaced from the outer rim and supported upon spokes radiating from the collar, traction lugs carried by the inner rim and slidable through the outer rim, and a plurality of chains connected at various points with the inner periphery of the outer rim and the outer periphery of the inner rim for effecting a drive connection between said rim.

2. In a wheel of the character described, a hub, spokes radiating therefrom and carrying an outer rim, said hub being formed with spaced sections, a collar located between the sections of said hub, an inner rim supported by spokes radiating from said collar, eccentric means for moving the collar and consequently the inner rim radially with respect to the hub and outer rim, and a plurality of flexible members connected at various points on the outer and inner rims and effect a driving connection.

3. In a wheel of the character described, an axle, a sectional hub mounted thereon, an outer rim carried by spokes radiating from the hub, an eccentric located between the sections of the hub, a collar surrounding said eccentric, an inner rim supported by spokes radiating from said collar, lugs carried by said inner rim and projectible through the outer rim, and means operable from a remote point for rotating the eccentric whereby to govern the point at which the inner rim will approach or recede from the outer rim.

4. A traction wheel comprising a sectional hub supported upon an axle, a sleeve rotatable upon the axle within the hub, means for advancing and retarding the position of the sleeve, an eccentric rigid upon the sleeve, a collar rotatably mounted upon said eccentric, an outer rim supported by spokes radiating from the first mentioned hub, an inner rim spaced from the outer rim and supported upon spokes radiating from the collar, a plurality of traction lugs loosely carried upon the inner rim and passing through openings in the outer rim, said traction lugs being formed with reduced extensions passing through holes in the inner rim and carrying stops, and coil springs encircling said extensions and abutting against the inner periphery of the inner rim, and a plurality of chains connected at various points with the inner periphery of the outer rim and the outer periphery of the inner rim for effecting a drive connection between said rims.

5. A traction wheel comprising a sectional hub supported upon an axle, an eccentric rotatable with respect to the axle and located between said sections, a collar rotatably mounted upon the eccentric, an outer rim supported by spokes radiating from the hub, an inner rim supported upon spokes radiating from the collar, means for rotating the eccentric, and traction means on the inner rim projectable through the outer rim.

6. A traction wheel comprising a sectional hub supported upon an axle, an eccentric rotatable with respect to the axle and located between said sections, a collar rotatably mounted upon the eccentric, an outer rim supported by spokes radiating from the hub, an inner rim supported upon spokes radiating from the collar, means for rotating the eccentric, and traction means on the inner rim projectable through the outer rim, and flexible members each connected with the inner periphery of the outer rim and the outer periphery of the inner rim for providing a drive connection.

In testimony whereof I affix my signature.

LOUIS W. ANTHONY.